United States Patent [19]

Erdman

[11] Patent Number: 4,963,088
[45] Date of Patent: Oct. 16, 1990

[54] SAFETY-RELATED PARAMETER INPUTS FOR MICROPROCESSOR IGNITION CONTROLLER

[75] Inventor: John L. Erdman, Eden Prairie, Minn.

[73] Assignee: Honeywell Inc., Minneapolis, Minn.

[21] Appl. No.: 239,453

[22] Filed: Sep. 1, 1988

[51] Int. Cl.⁵ .............................................. F23N 5/00
[52] U.S. Cl. ......................................... 431/2; 431/18; 431/86; 364/184
[58] Field of Search .................... 431/18, 24, 86, 73; 364/184, 187

[56] References Cited

U.S. PATENT DOCUMENTS

| | | | |
|---|---|---|---|
| 3,536,259 | 10/1967 | Okumura | 235/153 |
| 3,751,684 | 8/1973 | Struger | 307/202 |
| 3,849,056 | 11/1974 | Schuss | 431/24 |
| 4,264,898 | 4/1981 | Barman et al. | 346/347 |
| 4,518,345 | 5/1985 | Mueller et al. | 431/24 |
| 4,598,355 | 7/1986 | Shepler et al. | 364/184 |
| 4,613,072 | 9/1987 | Kikuchi et al. | 237/12.3 |
| 4,709,166 | 11/1987 | Banker et al. | 307/441 |
| 4,716,518 | 12/1987 | Hawkins et al. | 364/184 |

FOREIGN PATENT DOCUMENTS 0053447 6/1982 European Pat. Off. .............. 431/86

Primary Examiner—Carl D. Price
Attorney, Agent, or Firm—Kinney & Lange

[57] ABSTRACT

A control circuit for controlling the ignition time of a control system for a gas-fired combustion air heating appliance comprising a set of potentiometers and a controller for detecting failures in the control circuit. The set of potentiometers are used together to select the ignition time of the control system. The potentiometers are set to produce analog input signals which, when converted to digital signals, have a predetermined complementary relationship (such as one's or two's complement). The controller is connected to the set of potentiometers and includes an analog-to-digital converter which receives the analog input signals from the set of potentiometers and converts them into digital signals. The controller compares or analyzes the digital signals derived from the first and second potentiometers to detect failures in the control circuit and halts operation of the control system if the digital signals do not have the predetermined complementary relationship.

13 Claims, 1 Drawing Sheet

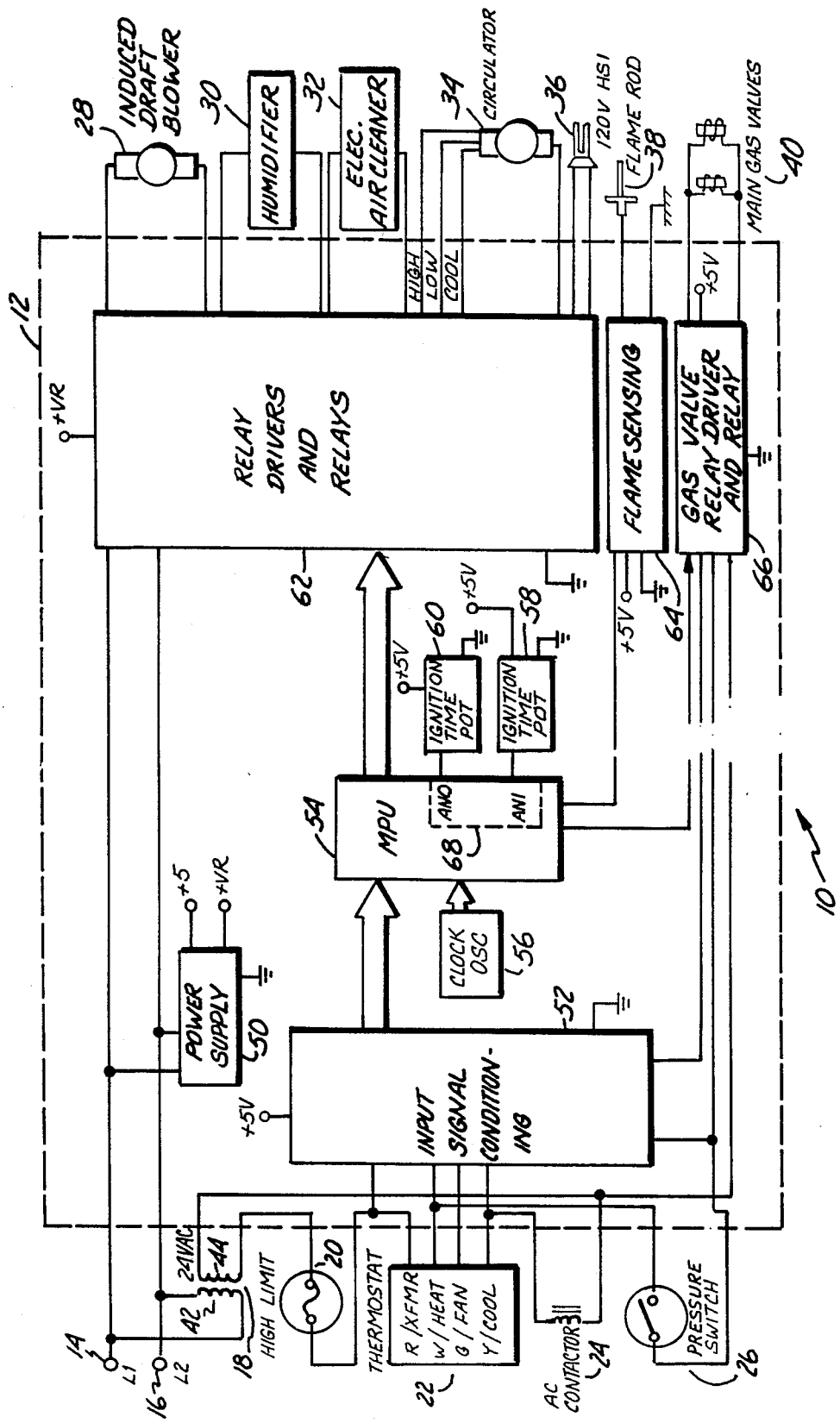

4,963,088

SAFETY-RELATED PARAMETER INPUTS FOR MICROPROCESSOR IGNITION CONTROLLER

REFERENCE TO COPENDING APPLICATION

Reference is hereby made to my copending patent applications entitled "DIGITAL CONTROLLER COMPONENT FAILURE DETECTION FOR GAS APPLIANCE IGNITION FUNCTION" U.S. patent application No. 07/239,450, "CONTROL SYSTEM FOR FORCED U.S. patent application No. 07/239,451 COMBUSTION AIR HEATING APPLIANCE", and "SPEED CONTROL FOR MULTITAP INDUCTION MOTOR" U.S. patent application No. 07/239,452 which are filed on even date with this application and are assigned to the same assignee.

BACKGROUND OF THE INVENTION

1. Field of the Invention

The present invention relates to ignition controllers for gas-fired forced combustion air heating appliances.

2. Description of the Prior Art

To obtain higher efficiency, many gas-fired furnaces use induced draft combustion air blowers and electronic fuel ignition. An important consideration for any ignition controller for a gas-fired heating appliance is safety in the case of a failure of one or more of the components of the appliance and its control system. For example, Underwriters Laboratory requirements for failure modes and effects analysis (FMEA) require that all single component failures either cause a safe shutdown of the appliance or, if undetected, the ignition control must continue to operate safely. If the ignition control continues to operate after a first order component failure, then for all combinations of second order failures, it must either continue to operate safely, or shutdown safely. This is a significant constraint when inputting a safety related variable control value such as an ignition time duration into an electronic ignition control.

Several potential problems exist with standard control systems for induced draft forced combustion air furnaces when considering the duration of an ignition light timing with an electronic ignition control. First, with analog controls, different resistor and capacitor values must be selected during the manufacturing of the control so that the final device operates with only a single fixed timing.

Second, with digital controls using microprocessor (MPU) based devices, the type of control manufacturing process used for analog controls is not normally used because it requires a different logic design for each timing desired, which is costly and takes away control flexibility. The normal method when using a digital control is to input the variable ignition timing value digitally through the digital control's input pins. However, this approach uses a large number of MPU input pins if the input variable value has a significant number of options. For example, if the ignition timing variable value has five options, then four input pins are required to input a fail safe code so that no single component goes undetected.

Third, the use of a digital control having an analog-to-digital convertor is a method for inputting a variable with a large number of options, without using a large number of device input pins, at low cost, and without restricting flexibility. One way to satisfy the safe failure modes requirement is to input the same ignition timing information through a second analog-to-digital input. However, this method detects only external control component failures, and does not address any internal failures in the controller logic.

SUMMARY OF THE INVENTION

The present invention is an improved control circuit for controlling the ignition time of a control system for a gas-fired, forced combustion air heating appliance. The control circuit comprises two potentiometers and a controller for detecting failures in the control circuit. The two potentiometers are independently connected to the controller and are used together to adjustably select the ignition time of the control system. The second potentiometer is set to a value having its digital conversion equal to a predetermined complement (e.g. the one's complement or two's complement) of the setting of the first potentiometer. The controller includes an analog-to-digital converter which receives the analog signals from the two potentiometers and converts them into digital signals.

The two potentiometers serve a safety related function by controlling the ignition light time for the heating appliance. The two potentiometers are set up so that if either of them fail, or if any related circuitry or internal controller logic fails, the controller will detect this failure and halt the ignition of the control system.

The first potentiometer value is set to the desired ignition light time, and the second potentiometer value is set so that its digital conversion is a predetermined complement of the value of the first potentiometer. After the analog potentiometer values have been inputted into the controller and converted to digital signals, the controller compares or otherwise checks the relationship between the two digital signals derived from the two potentiometers to detect failures in the control circuit. If the signal from the second potentiometer is not the expected predetermined complement of the signal of the first potentiometer, then the controller will halt operation of the control system to prevent any unsafe operation.

BRIEF DESCRIPTION OF THE DRAWINGS

The Figure shows a diagram of a control system for a forced combustion air heating appliance which includes the ignition controller connected to various inputs and outputs.

DETAILED DESCRIPTION OF THE PREFERRED EMBODIMENTS

Heating and air conditioning system 10 shown in the Figure includes ignition controller 12, a pair of AC power terminals 14 and 16, stepdown transformer 18, high limit thermal switch 20, thermostat 22, air conditioning contactor 24, combustion air proving pressure switch 26, induced draft combustion air blower 28, humidifier 30, electrostatic air cleaner 32, circulator fan motor 34, hot surface ignitor 36, flame rod 38, and main gas valves 40. Control system 10 is preferably used for a gas-fired central heating furnace which may be used in a typical residence. The furnace is a high-efficiency type furnace using induced draft forced combustion air (provided by induced draft blower 28) and features an electronic ignition (through hot surface ignitor 36).

Control system 10 is powered by single phase 120 volt, 60 Hz AC voltage which is received at power terminals 14 and 16. Step down transformer 18 has its primary winding 42 connected to terminals 14 and 16 and its secondary winding 44 connected to ignition controller 12 to provide a source of 24 volt, 60 Hz AC voltage. High limit switch 20, thermostat 22, AC contactor 24, pressure switch 26, and gas valves 40 operate on 24 volt AC power under the control of ignition controller 12. Induced draft blower 28, humidifier 30, electrostatic air cleaner 32, circulator fan 34, hot surface ignitor 36, and flame rod 38 all operate on 120 volt AC power provided through ignition controller 12.

As shown in the Figure, ignition controller 12 includes power supply 50, input signal conditioning circuitry 52, microprocessor (MPU) 54, clock oscillator circuit 56, ignition time potentiometers 58 and 60, relay drivers and relays 62, flame sensing circuit 64, and gas valve relay driver and relay circuit 66. MPU 54, which in one preferred embodiment is a 6810583 microprocessor, controls operation of relay drivers and relays 62 and gas valve relay driver and relay 66 as a function of input signals from input signal conditioning circuit 52 and flame sensing circuit 64. A more detailed description of the internal components and the operation of ignition controller 12 is provided in the copending patent application entitled "CONTROL SYSTEM FOR FORCED COMBUSTION AIR HEATING APPLIANCE", and that description is incorporated by reference.

The operation of the control circuit of the present invention is generally as follows. As microprocessor (MPU) 54 receives a request through input signal conditioning circuit 52 to ignite the combustion air heating appliance, MPU 54 controls the time duration in which the main gas valves 40 will remain open in order to ignite the heating appliance. Two safety-related ignition time potentiometers 58 and 60 are connected to microprocessor 54 to control the duration of the ignition light time. In one preferred embodiment of the present invention, potentiometers 58 and 60 are 20Kohm potentiometers which select an ignition light time range from about 4 to 20 seconds with two second increments. Potentiometer 58 is set to the desired ignition light time and provides an analog input value to microprocessor 54 analog at input pin AN1. Potentiometer 60 is set to a value different from that of potentiometer 58, but one which relates to the same desired ignition light time. Potentiometer 60 provides its analog input to microprocessor 46 through analog input pin AN0.

MPU 54 includes an on-board analog-to-digital (A/D) 68 converter located within its internal circuitry. The ignition light time controlled by potentiometers 58 and 60 is inputted into the A/D converter 68 of MPU 54 through input pins AN1 and AN0. The A/D 68 converter of MPU 54 converts the analog values of potentiometers 58 and 60 into two digital signals to be compared or otherwise analysed by MPU 54 to verify that the two signals have a predetermined complementary relationship. A failure in any control circuit component will result in a change in the value of either potentiometers 58 or 60 as read by MPU 54. In one preferred embodiment, potentiometer 60 is set to a value such that its digital conversion is the one's complement of the value of potentiometer 58. Therefore, a failure of either potentiometer 58 or 60 (or any of its connected circuitry), or a failure in any internal logic of MPU 54 will be detected by MPU 54. MPU 54 receives the converted digital values derived from potentiometers 58 and 60 and compares or analyses them, using any one of a number of well-known techniques. If the digital value from potentiometer 60 is not the one's complement of the digital value from potentiometer 58, meaning that a failure exists in some component of ignition controller 12, then MPU 54 will halt operation of control system 10.

In another preferred embodiment of the present invention, potentiometer 60 is set to a value such that its digital conversion is the two's complement of the value of potentiometer 58. MPU 54 compares or analyses the two digital values derived from potentiometers 58 and 60, and if the digital value from potentiometer 60 is not the two's complement of the value from potentiometer 58, then MPU 54 will halt operation of control system 10 since a failure exists in some component of ignition controller 12.

The present invention solves several safety-related problems that exist in prior art ignition controller circuits. In those ignition controllers using analog controls, different resistor and capacitor values must be selected during the manufacturing process so that the final device operates with only a single fixed timing. The prior art method when using these capacitor values must be selected during the manufacturing process so that the final device operates with only a single fixed timing. In control systems using digital controls with MPU based devices, the manufacturing process of the control systems using analog controls is not used because it requires a different logic design for each timing desired, which is costly and takes away control flexibility. The prior art method when using these digital control systems has been to input the variable ignition timing value digitally through the control's input pins. However, this approach uses a large number of MPU device pins if the input variable has a significant number of timing options. In those control systems using digital controls with analog-to-digital converters, a variable can be inputted with a large number of timing options, without using a large number of device input pins. However, these control systems only detect any external control circuit component failures, but do not detect any internal component failures in the controller logic.

With the present invention, only two analog input pins of MPU 54 are used to select ignition light time. By requiring that the digital converted values derived from two potentiometers 58 and 60 have a predetermined complementary relationship, MPU 54 detects any failures in the control circuit components used to provide the ignition light time. For example, if one of the potentiometers 58, 60 changes magnitude (due to failure, tampering or the like) without a corresponding opposite change in magnitude in the analog signal from the other potentiometer, MPU 54 will detect a failure condition. If input pins AN0 and AN1 are shorted together, the digital values produced will be the same rather than complementary, and MPU 54 will detect a failure condition. Similarly, a failure or malfunction of A/D converter 68 or any other component of MPU 54 which destroys the complementary relationship of the converted digital values from potentiometers 58 and 60 results in MPU 54 halting operation of control system 10.

Although the present invention has been described with reference to preferred embodiments, workers skilled in the art will recognize that changes may be made in form and detail without departing from the spirit and scope of the invention.

What is claimed is:

1. A control system for controlling ignition time of a gas-fired combustion air heating appliance, the control system comprising:
   a set of first and second potentiometers used together to select the ignition time of the appliance, the first and second potentiometers providing first and second analog signals, at least one of which is representative of the ignition time;
   means for converting the first and second analog signals to first and second digital signals,
   means for controlling the ignition time as a function of at least one of the first and second digital signals; and
   means for detecting a failure condition and inhibiting operation of the gas-fired combustion air heating appliance unless the first and second digital signals have a predetermined complementary relationship.

2. The control system of claim 1 wherein the predetermined complementary relationship is that the second digital signal is a one's complement of the first digital signal.

3. The control system of claim 1 wherein the predetermined complementary relationship is that the second digital signal is a two's complement of the first digital signal.

4. In a digital control system for controlling an apparatus based upon present safety-related input parameter, an improvement comprising:
   means for providing, as the preset safety-related input parameter, first and second individually variable analog signals;
   means for converting the first and second analog signals to first and second digital signals, respectively;
   means for controlling the apparatus based upon at least one of the first and second digital signals;
   means for inhibiting operation of the apparatus unless the first and second digital values have a predetermined complementary relationship.

5. The improvement of claim 4 wherein the predetermined complementary relationship is that the second digital signal is a one's complement of the first digital signal.

6. The improvement of claim 4 wherein the predetermined complementary relationship is that the second digital signal is a two's complement of the first digital signal.

7. The improvment of claim 4 wherein the means for providing first and second analog signals comprises:
   first potentiometer means for providing the first analog signal; and
   second potentiometer means for providing the second analog signal.

8. The improvement of claim 4 wherein the apparatus is a gas-fired apparatus, the preset safety-related input parameter is an ignition time for the gas-fired apparatus, and the means for inhibiting operation prevents ignition in the gas-fired apparatus unless the first and second digital valuers have the predetermined complementary relationship.

9. A method of controlling an apparatus based upon a preset safety-related input parameter, the method comprising:
   providing first and second individually variable analog signals, at least one of which is representative of the preset safety-related input parameter;
   converting the first and second analog signals to first and second digital signals respectively;
   checking the first and second digital signals to verify that they have a predetermined complementary relationship; and
   controlling the apparatus based upon at least one of the first and second digital signals.

10. The method of claim 9 and further comprising:
    inhibiting operation of the apparatus if the first and second digital signals do not have the predetermined complementary relationship.

11. The method of claim 10 wherein the apparatus is a gas-fired apparatus, the input parameter is an ignition time, and inhibiting operation includes preventing ignition in the gas-fired apparatus.

12. The method of claim 9 wherein the predetermined complementary relationship is that the second digital signal is a one's complement of the first digital signal.

13. The method of claim 9 wherein the predetermined complementary relationship is that the second digital signal is a two's complement of the first digital signal.

* * * * *